Dec. 31, 1968     E. W. APRI     3,419,308
LIMITED MOTION DEVICE FOR SHOULDER HARNESSES AND THE LIKE
Filed April 3, 1967     Sheet 1 of 2
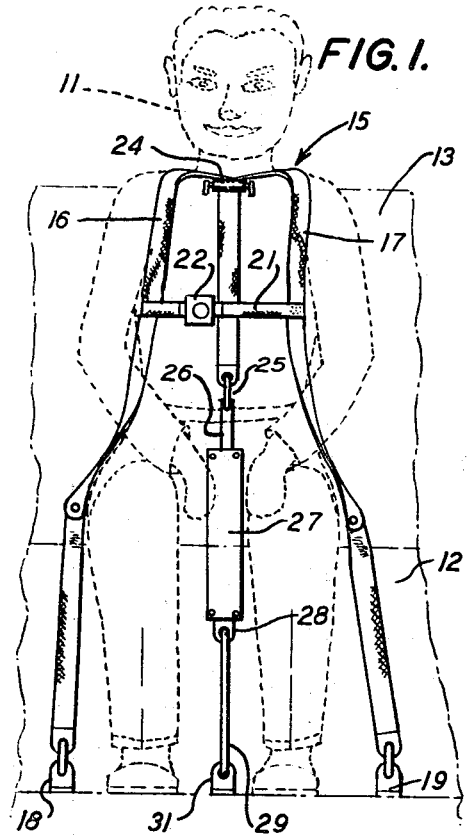
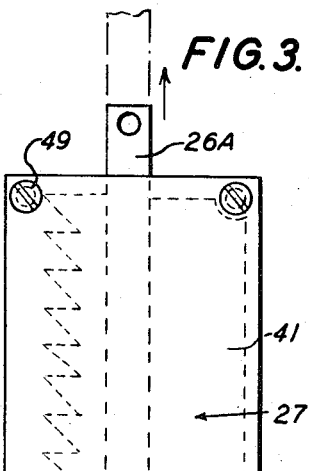
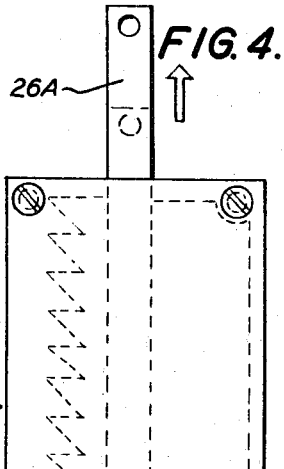
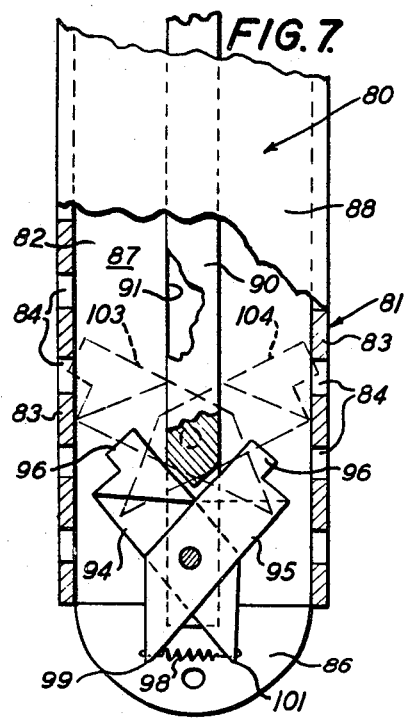
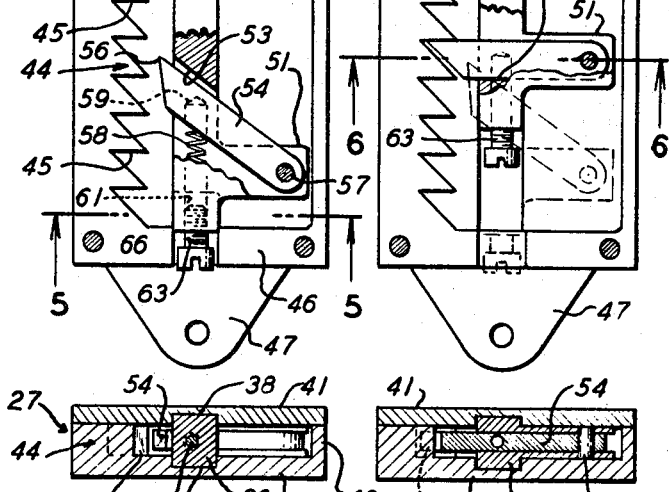
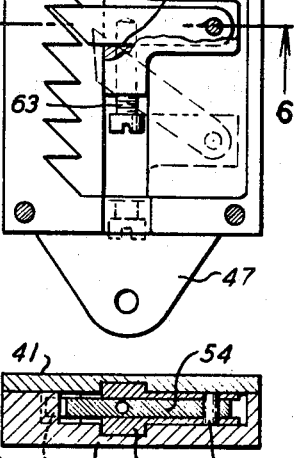
INVENTOR:
EDWARD W. APRI
BY
W. J. Gribble
ATTORNEY Dec. 31, 1968  E. W. APRI  3,419,308
LIMITED MOTION DEVICE FOR SHOULDER HARNESSES AND THE LIKE
Filed April 3, 1967  Sheet 2 of 2
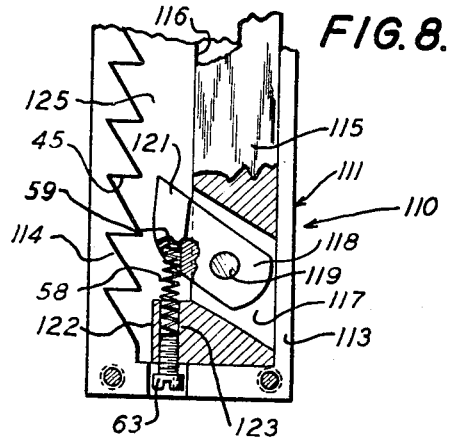
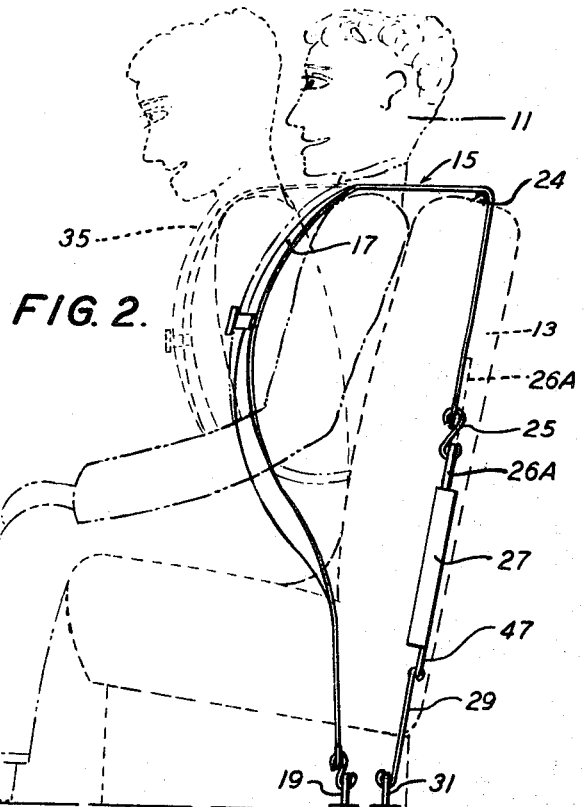
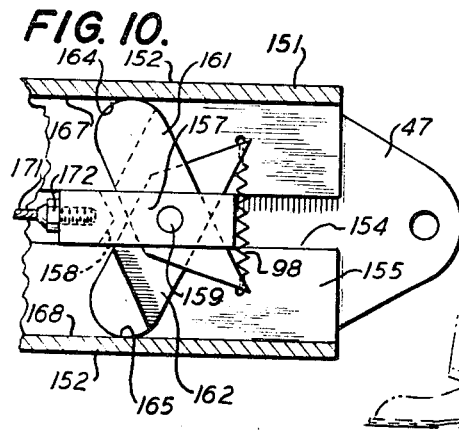
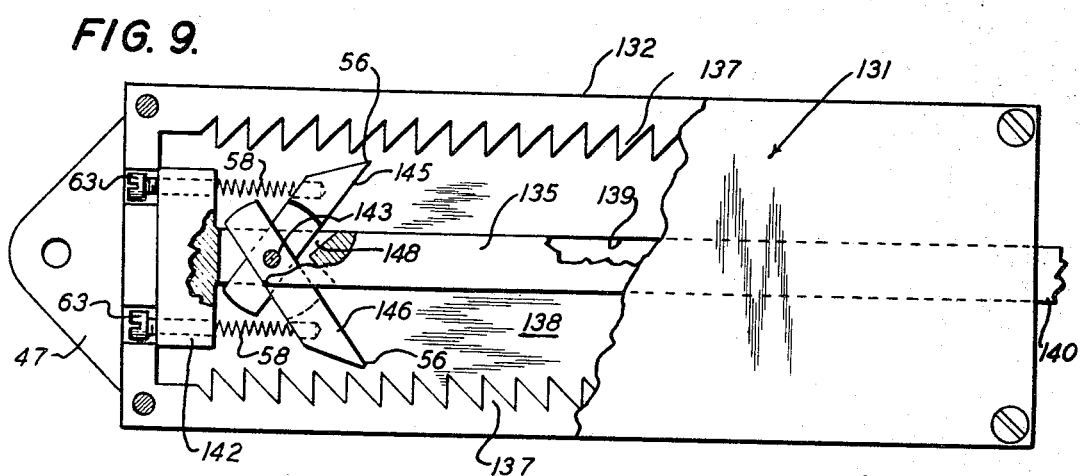
INVENTOR:
EDWARD W. APRI
BY
W. J. Gribble
ATTORNEY United States Patent Office 3,419,308
Patented Dec. 31, 1968

3,419,308
LIMITED MOTION DEVICE FOR SHOULDER HARNESSES AND THE LIKE
Edward W. Apri, 998 Lehigh St., Altadena, Calif. 91001
Filed Apr. 3, 1967, Ser. No. 628,078
7 Claims. (Cl. 297—386)

ABSTRACT OF THE DISCLOSURE

An inertia device for use with restraint straps wherein a slider carrying an acceleration-sensitive detent is movable in an anchored track that has detent-arresting teeth or apertures along the path of the slider. The slider pivotally mounts the detent with spring or weight bias that resists pivot motion of the detent into engagement with the detent-arresting teeth, so that slow motion of the restraint strap fastened to the slider is permitted, while fast acceleration is arrested.

Background of the invention

One of the great safety hazards in vehicle travel, whether the vehicle is an automobile, airplane or other moving carrier, is change in velocity of the vehicle and the resultant shift of the occupant(s) with respect to the vehicle. Harnesses restraining occupants have been made mandatory in many jurisdictions. The restraint harnesses are conventionally abdominal belts or shoulder harnesses of various types. Each, when fastened, is effective in restraining the occupant's motion with respect to the vehicle, usually holding the occupant in contact with the vehicle seat and back. However, while such restraint harnesses effectively preclude occupant displacement, they also so inhibit necessary or desired motion that they are not secured by many vehicle occupants. Apparatus restraining rapid motion of the occupant with respect to the vehicle while permitting slower movement of the occupant is therefore desired.

Several attempts to achieve devices of the desired type have been made. Most attempts failed because of high cost or the undependability of each such unit.

Summary of the invention

The invention contemplates motion-controlling apparatus for use with restraint straps or harness that comprises a track adapted to be anchored to the vehicle and contain a slider which reciprocates within the track. An acceleration-sensitive detent is pivotally mounted to an end of the slider. Detent arrestors such as rack teeth or wall apertures line the slider path on one or both sides. Means on the slider bias the detent against pivot motion into arresting engagement with the detent arrestors. The relationship of the detent, the bias loading and the arrestors is such that there is no arresting engagement in response to slow slider motion, but the detent and the detent arrestors engage to preclude further slider motion in response to fast slider motion or acceleration.

The end of the slider opposite the detent mount is conventionally fastened to an end of the restraint harness, such as the shoulder harness used in an automobile. The opposite end of the track is anchored to a portion of the vehicle such as the floor or frame. Other parts of the harness may also be fixed to the vehicle in accordance with the harness type.

The track and the slider may be mounted within the seat back of the vehicle between the springs and the back cover. The track may be formed by stamping and rolling processes, or from a recessed casting and a cover, or other conventional fabricating methods. Preferably the detent is pivotally mounted to the slider and spring loaded to bias the detent away from engagement with the arrestors. The spring loading may be adjustable to achieve free motion up to the desired acceleration rate.

The spring biasing may be replaced by a detent with proper weight away from the pivot point. Interchangeable weights may be used. Certain uses may call for a detent proportioned in terms of center of gravity so that the needed bias is inherent in the weight distribution with respect to the pivot point.

Either a single arrestor row along the slider track or a double arrestor row may be used. In the second instance the slider carries two detents mounted on the same pivot pin, with each of the detents adapted to engage a separate arrestor row.

The double arrestor rows embodiment is particularly useful in those vehicles in which the line of gravitational pull does not always coincide with the path of the slider. For instance, if the track and slider are oriented such that the slider path is horizontal and the arrestor rows one above the other, as may occur in some uses, the bias loading (which is normally uniform with both detents) will be unbalanced because one detent is pulled closer to the arrestors while the other detent is not.

Brief description of the drawing

FIG. 1 is a schematic front elevation showing the relationship of the inventive apparatus to a vehicle and its occupant;
FIG. 2 is a side elevation of the embodiment of FIG. 1;
FIG. 3 is a front elevation, partly broken away, of the apparatus of the invention in rest position;
FIG. 4 is a front elevation, partly broken away, of the embodiment of FIG. 3, as actuated by rapid acceleration;
FIG. 5 is a sectional view taken along line 5—5 of FIG. 3;
FIG. 6 is a sectional view taken along line 6—6 of FIG. 4;
FIG. 7 is a fragmentary elevation, partly broken away, of an alternate embodiment of the invention;
FIG. 8 is a further alternate embodiment of the invention shown in fragmentary sectional elevation;
FIG. 9 is an elevational view, partly broken away, of a further alternate embodiment of the invention employing two detents and two arrestor rows; and
FIG. 10 is a fragmentary plan section of a still further alternate embodiment of the invention.

Descirption of the preferred embodiment

FIGS. 1 and 2 show in dotted lines the occupant of a vehicle, the seat 12 and seat back 13 of which are also shown in dotted lines. Vehicle floor 14 is also dotted. The occupant is restrained by a shoulder harness assembly 15 of conventional design. The harness has the upper strap members 16, 17 that pass over each shoulder and down across the chest of the occupant and thence behind seat 12 to anchor points 18, 19 on floor 14 of the vehicle. A chest strap 21 with a release buckle 22 crosses the chest between members 16 and 17.

A roller 24, which is preferably mounted to the seat back, conveys the joined straps 16, 17 downwardly into the seat back to be fastened by a connector 25 to a slider 26 protruding from a track 27 of the arresting device. A lower track flange 28 is connected by a link 29 to a floor anchor 31 at the floor of the vehicle.

As can best be seen in FIG. 2, the occupant is restrained against the seat back until slider 26 moves vertically within track 27. The track itself cannot move because of link 29 and anchor 31.

FIG. 3 illustrates the condition of the apparatus when the occupant is in the phantom line position of FIG. 2 with his back against the seat back. In FIG. 4 the apparatus of the invention is shown in the condition induced by rapid forward motion by occupant, causing rapid acceleration of straps 16 and 17 across roller 24.

In order to achieve the forward dotted position 35 of FIG. 2, the occupant must move forward slowly such that straps 16, 17 do not rapidly accelerate slider 26.

In the device of FIGS. 1 through 6 slider 26 moves within track 27 in guide grooves 37, 38 of the track base 39 and cover 41, respectively. The track base has a cavity 42 within which the slider runs defined by a thin side wall 43, and a toothed rack 44 which contains a plurality of arrestor teeth 45. The cavity has a bottom wall 46 from which an anchoring flange 47 depends. The flange is an extension of a base back wall 48. Cover 41 is removably secured to the track base by conventional flathead screws 49.

A horizontal arm 51 extends toward the side wall 43 from the slider. The arm is vertically divided. The slider has a central recess 53 in which a detent 54 resides. One end of the detent is chamfered to define a sharp engaging point 56. The other detent end is rounded and receives a pivot pin 57 which extends through the divided arm 51 such that the detent rotates about the pin within the limits of recess 53. A light compression spring 58 resides in a depression 59 in the bottom edge of detent 54 and within a bore 61 in lower end of the slider. A spring adjusting screw 63 is threadably engaged in the bore such that it may be moved against the compression spring.

Upper end 26A of the slider may have a fastening hole 26B to afford attachment of the slider to the shoulder harness or other apparatus.

When the apparatus is at rest (FIG. 3) the slider rests on the bottom wall of the track base, with screw 63 extending through a relief hole 66 in wall 46. The hole also gives access to the screw for adjustment of the spring to alter the bias loading.

In operation the spring loads detent 54 way from contact with arrestor teeth 45 of rack 44. Relatively slow displacement of the slider due to harness movement, say in achieving position 35 of FIG. 2, is insufficient to change the position of detent 54 with respect to the arrestors against the pressure of spring 58. The slider may therefore be advanced to and beyond the dotted position 54A of FIG. 3 without arresting engagement between teeth 45 and detent point 56. It is thus clear that by moving slowly occupant 11 may adjust his position respecting the vehicle seat with some degree of freedom and still be secured against further rapid displacement forward with respect to the vehicle.

FIG. 4 illustrates the condition of the apparatus when the displacement of slider 26 is rapid enough for the inertia of the detent to overcome the biasing effect of spring 58. The protruding end of the detent has greater mass than the end beyond the pivot. As can be seen in that figure, rapid acceleration causes relative displacement of the slider with respect to the position of the detent so that the detent pivots about pivot 57 such that it contacts arrestor 45A. Further motion of the slider brings a lower wall 71 of recess 53 into contact with the detent. The slider can then no longer advance due to the arresting engagement between detent and arrestor tooth 45A. The occupant is thus protected against harmful displacement with respect to the vehicle.

The engagement of the detent with the arrestor rack is extremely rapid once acceleration of the slider due to harness motion reaches a predetermined level. Occupant 11 is firmly held against seat back 13. Adjustment of screw 63 changes the bias load on the detent, enabling a wide range of acceleration "trigger points" to be selected and accurately maintained. Thus the invention is adapted to a wide range of uses, particularly since relaxation of forward harness pull results in quick disengagement of the detent from the arrestor, enabling rest position to be restored quickly.

FIG. 7 illustrates an alternate embodiment of the invention wherein a motion control device 80 has a track 81 with a track base 82 having parallel spaced side walls 83. Each sidewall has a plurality of equally spaced arrestor apertures 84 punched or otherwise formed in the side walls. An anchor flange 86 depends from the track base as an extension of a base back wall 87. A cover 88 is conveniently secured to the track base and retains a slider 90 within the track base to reciprocate in a track groove 91. The lower portion of the slider is bifurcated. A pivot pin 92 pivotally mounts two oppositely disposed detents 94 and 95. Each detent has a relatively heavy square engaging end 96. The ends are biased away from arrestor apertures 84 by an extension spring 98 extending between tapering tips 99, 101 of detents 94, 95 respectively.

The embodiment of FIG. 7, like that of FIGS. 1–6, has detents that are moved into arresting engagement by rapid acceleration of slider 90. Dotted lines 103, 104 of FIG. 7 show the arrested condition of the motion control device.

When slider motion upwardly is slow, the detent configuration shown in solid lines is maintained while the slider migrates upwardly along groove 91 in the track base.

FIG. 8 illustrates a further alternate embodiment of the invention wherein a control device 110 comprises a track 111 with a track base 112. The base has a side wall 113 spaced from and paralleling a rack wall 114 which has a plurality of vertically separated arrestor teeth 45. A slider 115 reciprocates within the track base along a base groove 116.

The slider has a lower recess 117 within which a detent 118 is pivotally mounted by a pivot pin 119 which passes through the walls of the recess on the vertical centerline of the slider. The engaging nose 121 of the detent is thicker, and therefore heavier, than that detent portion through which the pin passes. The slider has a foot 122 which protrudes toward the rack wall. The foot has a vertical aperture which is threaded for most of its length. An adjusting screw 63 is threadably engaged within the aperture to bear against a compression spring 58 whose opposite end resides in a recess 59 in the under side of the detent nose. The slider is movable in reciprocating fashion in guide groove 116 of a back wall 125 of the base.

The operation of the device of FIG. 8 is the same as described for the previous embodiments.

All of the previously described embodiments have been illustrated with the device oriented to have vertically reciprocating sliders. In the embodiment of FIG. 9 the slider reciprocates horizontally. A motion control device 131 has a track 132 with a track base 133 within which a slider 135 reciprocates. The base has spaced, parallel rack walls 137 and a back wall 138. One rack is above the other. A guide groove 139 in back wall 138 restrains the slider from movement between the racks. The slider has an external end 140 with a hole 141 by which the restraint strap may be secured. At the opposite end of the slider is a double foot 142 that extends from the slider toward each rack. Above the foot a pivot pin 143 pivotally secures a pair of detents 145, 146 similar to detent 54 of FIGS. 3 and 4. Like detent 54, each detent 145, 146 has a chamfered end forming a sharp arrestor-engaging point 56, 56A respectively. The points are thicker than the overlapping portions of the detents, which are thinned to fit within a cavity 148 in the lower end of the slider. Upper walls 151, 152 and lower wall 153 define the cavity A spring 58 bears against each detent, biasing it away from contact with the arrestor racks. The springs reside in recesses 155, 156 of each detent and in bores 123 of each extension of the double foot. Each spring is adjustable by means of a screw 63 threadably engaged in a bore 123.

In operation the load of upper spring 58 is augmented by the pull of gravity upon the detent 145 in the orientation shown. In other orientations the detent positions may be reversed. The loading bias of the lower spring is lessened by gravity. Because the slider not only moves horizontally, but is oriented so that gravity affects the inertial resistance to rotation of a detent, it is necessary to have two detents so that one will operate under high acceleration of the slider despite gravity. Obviously, the embodiment of FIG. 9 is also operative in other orientations, as are the previously described embodiments.

The embodiment of FIG. 10 is shown oriented for horizontal operation, but with both of its two detents in the same horizontal plane. A track base 151 of a motion arresting device has side walls 152 defining a track with a guide groove 154 in a base back wall 155. The groove is centrally placed between parallel side walls 152 and guides a slider 157 which may be further constrained by a cover (not shown).

The slider is a short block with a bifurcating slot terminating at one end in an angular wall 158 and open at the end of the slider. A pivot pin 159 mounts a pair of detents 161, 162 which are biased against arrestor engagement by an extension spring 98 secured between the nonengaging ends of the detents in the manner set forth in the description of FIG. 7.

The detents have rounded engaging tips 164, 165. The tips are normally retained by the spring in less diverging attitude than shown in FIG. 10. However, an accelerating force acts on the slider by means of a flexible cable 171 such that tips 164, 165 of the detents engage arrestor surfaces 167, 168, respectively. A threaded connector 172 joins the cable to the slider.

The arrestor surfaces are continuous and parallel to the path of the slider. Arresting effect is due to the relative inertia of the detent tips with respect to the accelerated slider 157, which causes the detent tips to pivot outwardly into frictional contact with the arrestor surfaces when accelerated sufficiently to defeat spring 98. The slider is then arrested in its leftward path in the figure.

A cable such as the one attached to the slider affords flexibility in mounting the slider-containing track. Since there is no straight line protrusion of the slider from the track there is less linear space needed for mounting the device.

While the detents of FIG. 10 are shown as having rounded tips, many other tip configurations have proved efficacious. The continuous arrestor surfaces are adequate for many situations, although lacking in the positive mechanical engagement of the multi-intersticed arrestors of the other embodiments.

The illustrative devices shown and described herein do not exhaust the range of the invention. Many variations within the scope of the invention will occur to those skilled in the art. Therefore, I desire that the invention be measured by the appended claims rather than by the purely illustrative embodiments set forth above.

I claim:
1. Motion arresting apparatus for use with a restraint strap comprising a track adapted to be anchored, a slider movable back and forth along the track, an acceleration sensitive detent pivotally mounted to the slider, a detent arrestor on the track along the slider path, and means biasing the detent to resist pivot motion of the detent into arresting engagement with the detent arrestor, the relationship of the detent bias and the arrestor being such that no engagement of the detent occurs in response to slow slider motion but detent and detent arrestor engage to preclude further slider motion in response to rapid acceleration of the slider.

2. Apparatus in accordance with claim 1 wherein a spring mounted between the slider and the detent biases the slider against engagement with the arrestor.

3. Apparatus in accordance with claim 1 wherein a weight remote from the pivot point biases the detent against engagement with the arrestor.

4. Apparatus in accordance with claim 1 wherein detent arrestors are positioned along opposed sides of the slider path, and a pair of detents are pivotally mounted to the slider on a common pivot pin to protrude oppositely from the slider toward the arrestors on each side of the track.

5. Apparatus in accordance with claim 1 further comprising adjustable means for changing the bias load on the detent.

6. Apparatus in accordance with claim 1 wherein the arrestor comprises a multiplicity of interstices.

7. Apparatus in accordance with claim 1 wherein the arrestor comprises a continuous surface.

References Cited

UNITED STATES PATENTS

| | | | |
|---|---|---|---|
| 2,622,664 | 12/1952 | Koehler et al. | 244—122.2 X |
| 2,649,145 | 8/1953 | McCarthy | 244—122.2 X |
| 2,776,093 | 1/1957 | Cox et al. | 242—47.5 |
| 3,343,765 | 9/1967 | Baker | 242—107.4 |

BENJAMIN HERSH, *Primary Examiner.*

J. SIEGEL, *Assistant Examiner.*

U.S. Cl. X.R.

240—107.4; 280—150; 297—389